United States Patent [19]

Hedges

[11] Patent Number: 4,473,116
[45] Date of Patent: Sep. 25, 1984

[54] METHOD OF DETERMINING SODIUM CHLORIDE EQUIVALENCY FOR IMPROVED OIL RECOVERY PROCESSES USING SURFACTANT COMPOSITIONS

[75] Inventor: James H. Hedges, Bartlesville, Okla.

[73] Assignee: Phillips Petroleum Company, Bartlesville, Okla.

[21] Appl. No.: 408,965

[22] Filed: Aug. 17, 1982

[51] Int. Cl.³ .................. E21B 43/22; E21B 47/00
[52] U.S. Cl. ................................ 166/252; 166/273; 166/274
[58] Field of Search .................. 166/252, 273–275; 252/8.55 D

[56] References Cited

U.S. PATENT DOCUMENTS

| | | | |
|---|---|---|---|
| 3,493,048 | 2/1970 | Jones | 166/252 |
| 3,885,628 | 5/1975 | Reed et al. | 166/252 |
| 3,981,361 | 9/1976 | Healy | 166/252 |
| 4,074,755 | 2/1978 | Hill et al. | 166/252 |
| 4,079,785 | 3/1978 | Hessert et al. | 166/252 X |
| 4,122,895 | 10/1978 | Sitton et al. | 166/252 |
| 4,125,156 | 11/1978 | Glinsmann | 166/252 |
| 4,258,789 | 3/1981 | Hedges et al. | 166/252 |
| 4,265,308 | 5/1981 | Hedges et al. | 166/252 |
| 4,299,711 | 11/1981 | Tyler et al. | 166/252 X |
| 4,330,148 | 5/1982 | Glinsmann et al. | 166/275 X |

Primary Examiner—George A. Suchfield
Attorney, Agent, or Firm—French and Doescher

[57] ABSTRACT

The sodium chloride equivalency of brine from a subterranean oil bearing reservoir is determined by equilibrating said brine with a known surfactant system and a standard hydrocarbon to give a multiphase system which is compared with known phase volume diagrams using the same ingredients at various sodium chloride concentrations to determine the salinity of the known systems at which the relative volumes correspond to those of the unknown system, this being the sodium chloride equivalency number of the unknown system. The above procedure can be used to allow use of standardized phase volume diagrams to tailor a surfactant system for a particular reservoir even though the reservoir does not have pure sodium chloride as the brine. In a more specific embodiment, the above system can be used even if the sodium chloride equivalency of the reservoir is quite high by utilizing as the cosurfactant an ethoxylated sulfated phenol and preparing a series of multiphase systems by equilibrating oil corresponding to that in the reservoir, a standard surfactant, and a series of ethoxylated sulfated phenol cosurfactants of varying degrees of ethoxylation, all at the brine concentration of the reservoir to determine a system having an optimum salinity (i.e., where the volume of oil and water in the microemulsion phase is about equal) which is relatively low, i.e., about 1 percent. Thereafter, additional samples are prepared at higher surfactant concentrations, all of the other ingredients being equal and the resulting systems are used to displace oil from a test core, the results applied so as to determine the cosurfactant concentration at which maximum oil recovery is obtained.

24 Claims, 13 Drawing Figures

RELATIONSHIP OF THE WIDTH IN ppm NaCl OF THE
THREE-PHASE REGION AND EQUIVALENT ALKANE CARBON NUMBER OPTIMAL SALINITY VERSUS ALKANE CARBON NUMBER
FOR SYSTEMS CONTAINING VARIOUS SULFONATES PLUS ISOBUTANOL OPTIMAL SALINITY VERSUS ALKANE CARBON NUMBER FOR
SYSTEMS CONTAINING TRS10-410 PLUS VARIOUS COSURFACTANTS.

METHOD OF DETERMINING SODIUM CHLORIDE EQUIVALENCY FOR IMPROVED OIL RECOVERY PROCESSES USING SURFACTANT COMPOSITIONS

BACKGROUND OF THE INVENTION

This invention relates to surfactant systems for recovery of oil from subterranean reservoirs.

It has long been known that the primary recovery of oil from a subterranean formation leaves a substantial amount of the oil in the formation. This has led to what is commonly referred to as secondary recovery or water flooding where a fluid such as brine is injected into a well to force the oil from the pores of the reservoir toward a recovery well. However, this technique also leaves substantial amounts of oil in the reservoir, so-called residual oil, because of the capillary retention of the oil. Accordingly, surfactant systems have employed either in place of the secondary recovery or more generally in a tertiary recovery process. One particularly suitable type of surfactant system is that which results in the in situ formation of a microemulsion which is immiscible with the oil it is displacing. Such microemulsion systems are very effective in removing residual oil.

The surfactant systems employed to produce microemulsion type oil recovery basically contain at least three separate ingredients, brine, a surfactant, and a cosurfactant. It is disclosed in Hedges et al, U.S. Pat. No. 4,265,308 (May 5, 1981) how to correlate these three ingredients so as to arrive at a combination of surfactant and cosurfactant at a unique salinity concentration at which maximum oil recovery is obtained.

Work with surfactant systems to produce model compositions is conventionally done using sodium chloride as the salt in the brine. However, many reservoirs in fact contain a mixture of salts in the brine and different salts cause a different interrelationship between the necessary combination of surfactant and cosurfactant required to give good oil recovery.

SUMMARY OF THE INVENTION

It is an object of this invention to correlate the mixed brine found in an actual reservoir with pure sodium chloride brines;

It is a further object of this invention to quickly determine the sodium chloride concentration which would be equivalent in its practical effect to the concentration of mixed salts in an actual reservoir;

It is a further object of this invention to design a surfactant system tailored for the specific oil and brine found in an actual reservoir;

It is a further object of this invention to design a surfactant system suitable for reservoirs containing divalent ions and other mixed ions;

It is still yet a further object of this invention to systematically provide a surfactant system for a specific reservoir which is relatively resistant to the debilitating effects of changes in the surfactant system compositions, adsorption and precipitation found in the reservoir;

It is still yet an further object of this invention to provide an improved method of tailoring a surfactant system for a particular reservoir; and It is still yet a further object of this invention to provide a novel optimization scheme for high NaCl equivalent systems.

In accordance with the first aspect of this invention, a standard oil sample is equilibrated with a standard surfactant system made up using a brine from an actual reservoir and the resulting multiphase composition compared with known multiphase microemulsion systems to determine the sodium chloride equivalency of the reservoir brine. In a more specific embodiment of the first aspect of the invention, the oil from the reservoir is equilibrated with known surfactant systems to determine the equivalent alkane carbon number (EACN) of the oil, and a suitable surfactant system for the reservoir oil and brine is determined from standardized graphs of oil recovery versus salinity for the same equivalent alkane carbon number hydrocarbon.

In accordance with the second aspect of this invention, an ethoxylated sulfated alkyl phenol is used as a cosurfactant at a low concentration in a microemulsion system to produce an optimized system and then a series of similar systems are made up only at higher cosurfactant concentrations and these are used to recover oil from test cores with the results used to find the cosurfactant concentration at which maximum oil is recovered.

BRIEF DESCRIPTION OF THE DRAWINGS

In the drawings, forming a part hereof.

DESCRIPTION OF THE PREFERRED EMBODIMENTS

First Aspect

Figure 1:
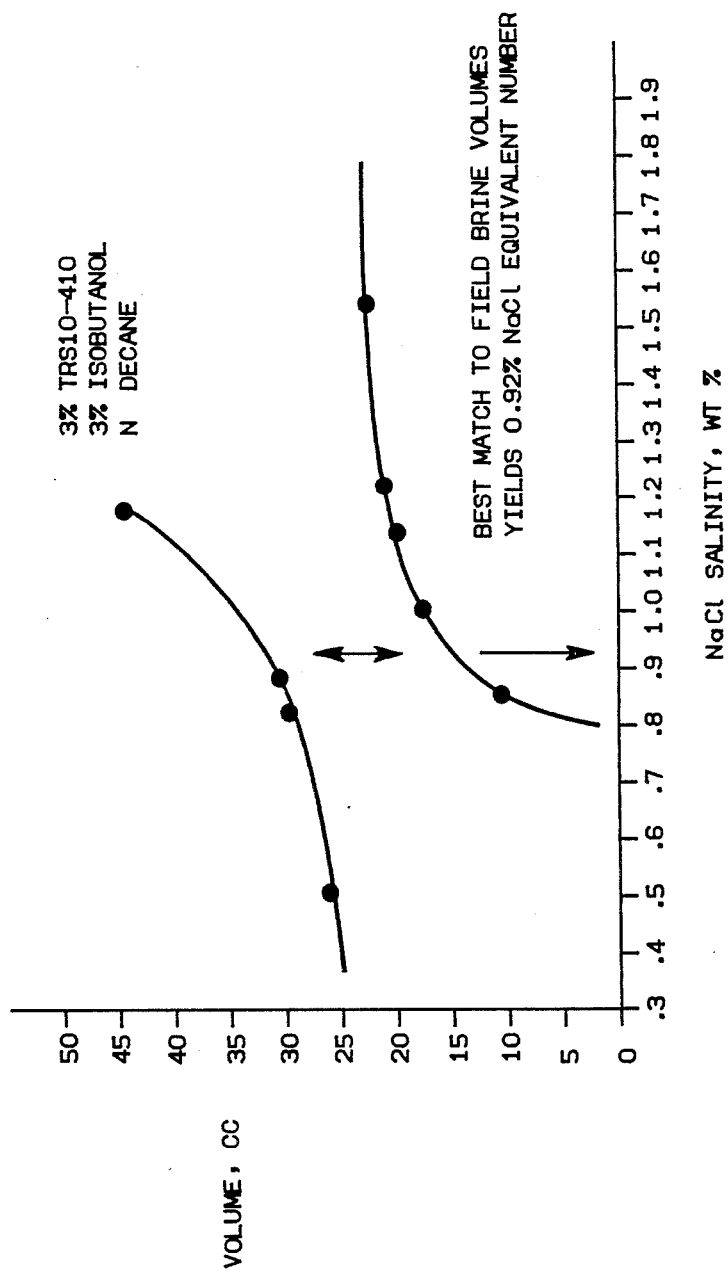
FIG. 1 depicts comparing the phase volume behavior of an actual reservoir brine equilibrated with a known surfactant system and known oil on the one hand with a series of equilibrations of the same oil and same surfactant system with known concentrations of sodium chloride.

FIG. 1 is a phase-volume diagram plotting the volume percent of the various phases obtained on equilibrating surfactant, cosurfactant and oil as a function of NaCl concentration. This gives the basic curve of FIG. 1, i.e., the curve exclusive of the arrows. A surfactant system comprising the same surfactant and cosurfactant and the same hydrocarbon used to prepare the basic phase-volume diagram curve of FIG. 1 is equilibrated using as the brine, the salt solution from an actual formation. On equilibration of the surfactant-cosurfactant-hydrocarbon-brine (from the formation), the phase-volume behavior is observed and correlated with the known curve as set out by the arrows in FIG. 1. The point at which the two coincide as shown by the arrows indicates that ths is the equivalent salinity of the reservoir brine. For instance, the actual brine for the reservoir may have a weight percent salt content of only 0.1 weight percent, but because it may contain divalent ions or other ions which act differently than sodium chloride, its equivalent effect is the same as a sodium chloride solution of 0.92 weight percent. Hence, it is stated, in accordance with the invention herein, that it has a sodium chloride equivalent number of 0.92 weight percent.

Figure 2:
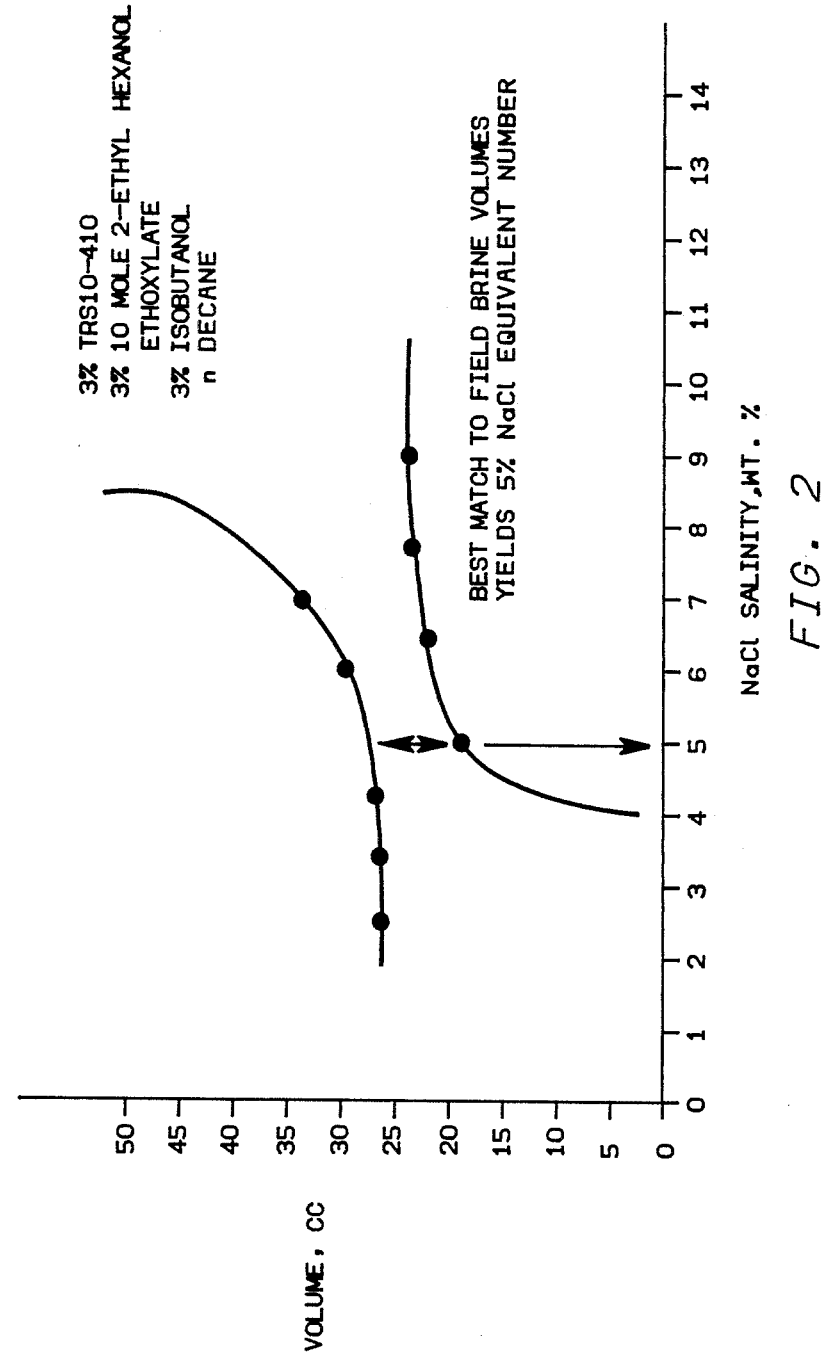
FIG. 2 is a figure similar to FIG. 1 with a different actual formation brine.

FIG. 2 is identical to FIG. 1 except the actual field brine corresponds to about 5 weight percent sodium chloride. It is noted that a different cosurfactant was used to prepare these solutions than was used in FIG. 1. It is apparent that if the formation brine being tested in FIG. 2 were used in the system of FIG. 1, its three phase region would be off the scale.

With field brines having a sodium chloride equivalency as high as 5 percent as shown in FIG. 2, it may be that it is not possible to produce a surfactant system wherein the optimal salinity and unique salinity coincide which means that either the formation must be preflushed or a very low equivalent weight sulfonate must be used so as to push the area of high oil recovery to the highest possible salinity. In either event, it is apparent from FIG. 3 to be described hereinafter that it is unlikely the best results could be obtained in an actual reservoir having ions other than sodium chloride without the use of the technique of this invention to pinpoint the sodium chloride equivalency of the brine so that standard charts relating oil recovery with known surfactant systems would be applicable.

Figure 3:
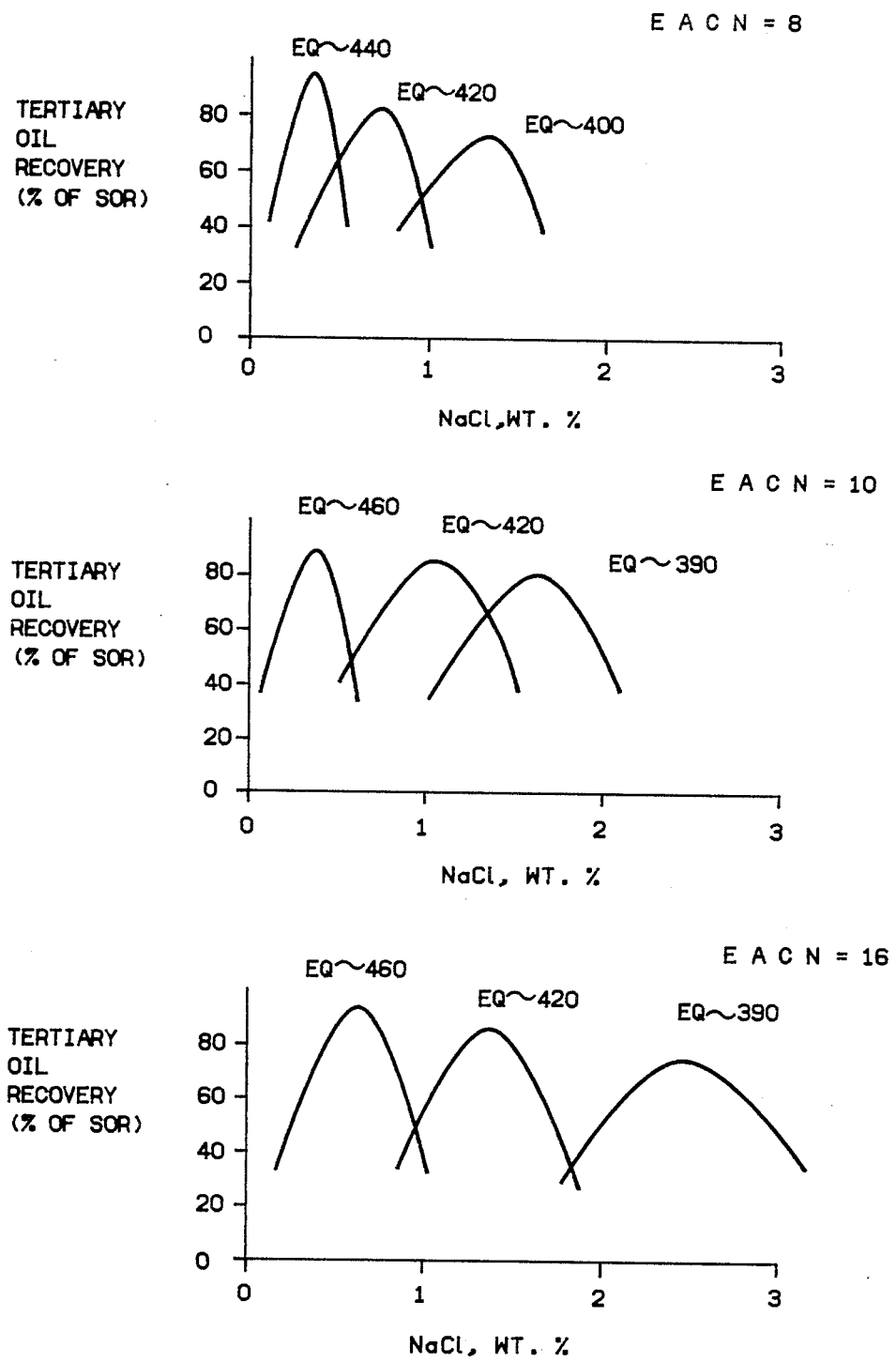
FIG. 3 shows a series of standardized plots of oil recovery versus sodium chloride concentration, the upper portion of the figure shows the results at optimum salinity using three sulfonates of different equivalent weight; the middle part of the figure shows the same type of plots using a different hydrocarbon to simulate the oil and the lower portion of the graph shows yet a third set of standard plots using a third hydrocarbon to simulate actual oil.

FIG. 3 is a plot of sodium chloride weight percent versus tertiary oil recovery for three separate hydrocarbons corresponding to oils of varying molecular weight. In the top figure, a relatively low EACN oil is used with three different equivalent weight sulfonates. In the middle curve, the same type of plots are shown with a higher EACN hydrocarbon and in the bottom curve, the same plots are shown with yet a higher EACN hydrocarbon. As can be seen, as the EACN of the hydrocarbon increases, higher equivalent weight sulfonates are required to achieve high oil recovery. Further, it is evident that for any given system, lower equivalent weight sulfonates are required at the higher sodium chloride concentration.

To utilize the main aspect of the invention, two things are done. First, the equivalent alkane carbon number of the oil is determined. Then the sodium chloride equivalency of the brine is determined. With these two factors from the unknown formation correlated with standard hydrocarbons and with standard sodium chloride solutions respectively, a proper surfactant system for a given formation can be determined. For instance, if it is shown that the eqivalent alkane carbon number of the oil in a reservoir is 10 and that the sodium chloride equivalency is 1 percent, a view of the middle portion of FIG. 3 shows that a 420 equivalent weight sulfonate surfactant is needed. If the EACN of the oil should have turned out to be 8 instead of 20, it is apparent from the upper portion of FIG. 3 that the proper equivalent weight if the brine has a 1.0 sodium chloride equivalency is about 410 instead of 420. Again, it is readily apparent that there is no way that the proper system could be achieved intuitively or even with rather massive trial and error techniques without using the techniques disclosed in this invention if the reservoir brine is not essentially equivalent to pure sodium chloride. That is, if the sodium chloride equivalency of a reservoir brine which had a 1 percent salt content turned out to have a sodium chloride equivalency of 1, then, of course, the technique shown in the Hedges et al patent, for instance, could be used without the present invention. However, if the reservoir brine is not essentially aqueous sodium chloride, its sodium chloride equivalency is not numerically equal to the weight percent salts in said brine. Hence, the invention in many practical applications represents a sophisticated and an unobvious improvement over the Hedges et al disclosure.

Figure 7:
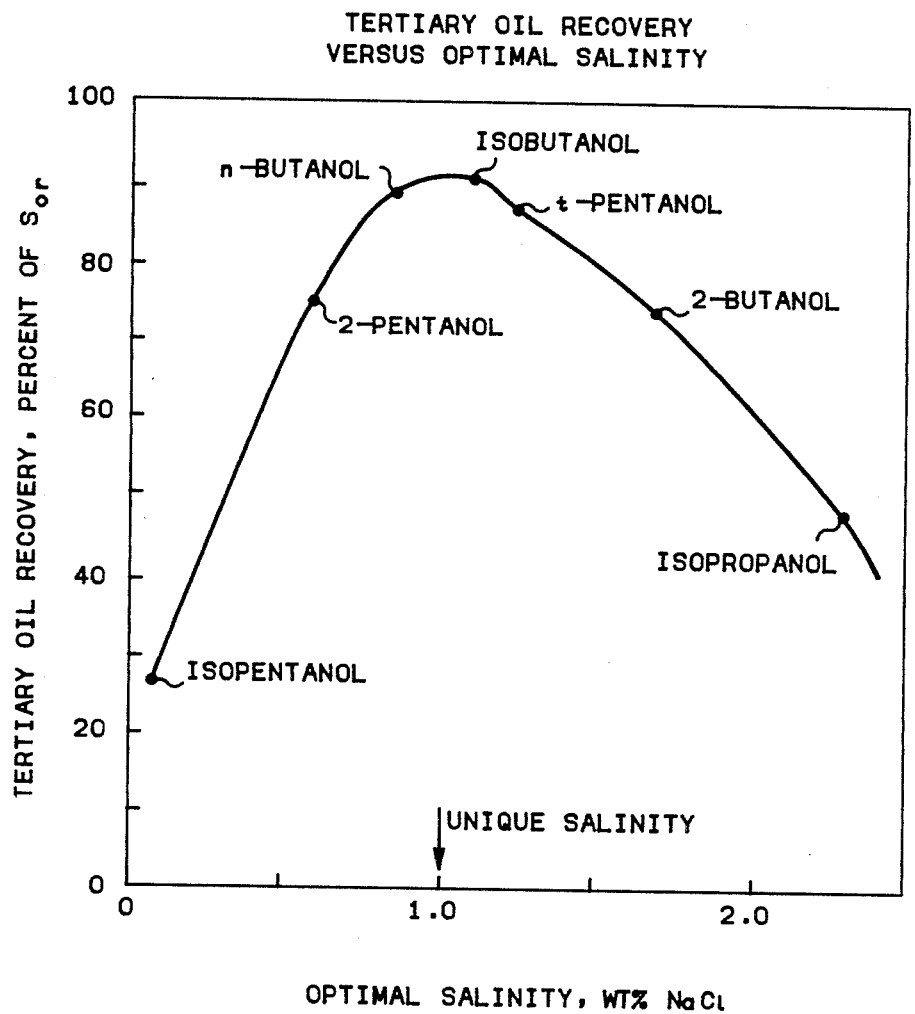
FIG. 7 is a plot of oil recovery at the optimum salinity for surfactant systems using a single surfactant and varying cosurfactants.

All of the points on the curves of FIG. 3 are obtained at the optimal salinity for the particular sulfonate used. Thus the points at the top of each curve represent the point at which the optimal and unique salinities coincide. The various curves showing the increase, maximum, and decrease of tertiary oil recovery for any given equivalent weight sulfonate illustrate the use of different alcohols at optimal salinities to establish the curves as shown in FIG. 7, i.e., each of the three curves in the top portion of FIG. 3 represents a curve such as shown in FIG. 7.

The following is given by way of additional background for an understanding of both this and the second aspect of this invention: A microemulsion oil recovery system comprises four ingredients:

(1) a surfactant such as a petroleum sulfonate;
(2) a cosurfactant such as an alcohol;
(3) brine, i.e., a water and a salt such as sodium chloride; and
(4) a hydrocarbon which can be added above ground or can be the oil in the reservoir which is used to form the microemulsion in situ. Such systems are broadly known as shown in Hessert et al, U.S. Pat. No. 4,079,785, issued Mar. 21, 1978, the disclosure of which is hereby incorporated by reference.

It is known that subtle differences in any of the four ingredients has a profound effect on the effectiveness of the system. Obviously, there is no leeway in varying the hydrocarbon in the ground since it is in place and the object is to recover it. There is some leeway in varying the brine in that a preflush can be used, but this adds to the expense. Thus, as a practical matter the surfactant and/or cosurfactant must generally be tailored to the brine and oil in each formation to be flooded, or at the very least tailored to the brine present after any preflush.

Tailoring of surfactant systems is known in the art. Glinsmann, U.S. Pat. No. 4,125,156, issued Nov. 14, 1978, the disclosure of which is hereby incorporated by reference, discloses how to systematically optimize a system wherein at an optimum salinity a multiphase system, generally three phases, forms in which the microemulsion phase has approximately equal volumes of oil and water. This optimal salinity is quite correctly associated with relatively high oil recovery.

It is further known as disclosed by Hedges et al, U.S. Pat. No. 4,265,308, issued May 5, 1981, the disclosure of which is hereby incorporated by reference, to further tailor a surfactant system so that the optimum salinity is chosen at a value which is in fact the one very best or unique salinity for the oil-surfactant combination used. This is done as follows:

(a) preparing a series of aqueous surfactant-cosurfactant-electrolyte systems at varying electrolyte concentrations using a relatively water insoluble cosurfactant, mixing oil to be displaced or its equivalent with the thus produced systems, allowing the resulting mixtures to equilibrate and determining the salinity at which the microemulsion phase formed on said equilibration has approximately equal volumes of oil and water, thus giving the optimal salinity concentration for this surfactant-cosurfactant system;

(b) preparing a series of aqueous surfactant-cosurfactant-electrolyte systems at varying electrolyte concentrations using a relatively water soluble cosurfactant, mixing oil to be displaced or its equivalent with the thus produced systems, allowing the resulting mixtures to equilibrate and determining the salinity at which the microemulsion phase formed on said equilibration has approximately equal volumes of oil and water, thus giving the optimal salinity concentration for this surfactant-cosurfactant system;

(c) preparing at least one series of surfactant-cosurfactant-electrolyte systems at varying electrolyte concentrations using cosurfactants having a solubility intermediate between that of said cosurfactants of (a) and (b), mixing oil to be displaced or its equivalent with the thus produced systems, allowing the resulting mixtures to equilibrate and determining the salinity at which a microemulsion phase formed on said equilibration has approximately equal volumes of oil and water, thus giving the optimal salinity concentration for each surfactant-cosurfactant system;

(d) utilizing said systems of (a), (b) and (c) described hereinabove at optimal salinity to recover oil from a core under the same or similar conditions and plotting the percentage oil thus recovered versus the salinity of each system; and (e) determining from said plot of (d) the unique salinity at which maximum oil recovery is obtained. While the optimal salinity determination is fully described in said Glinsmann patent, the following brief summary is believed appropriate at this point.

Figure 5:
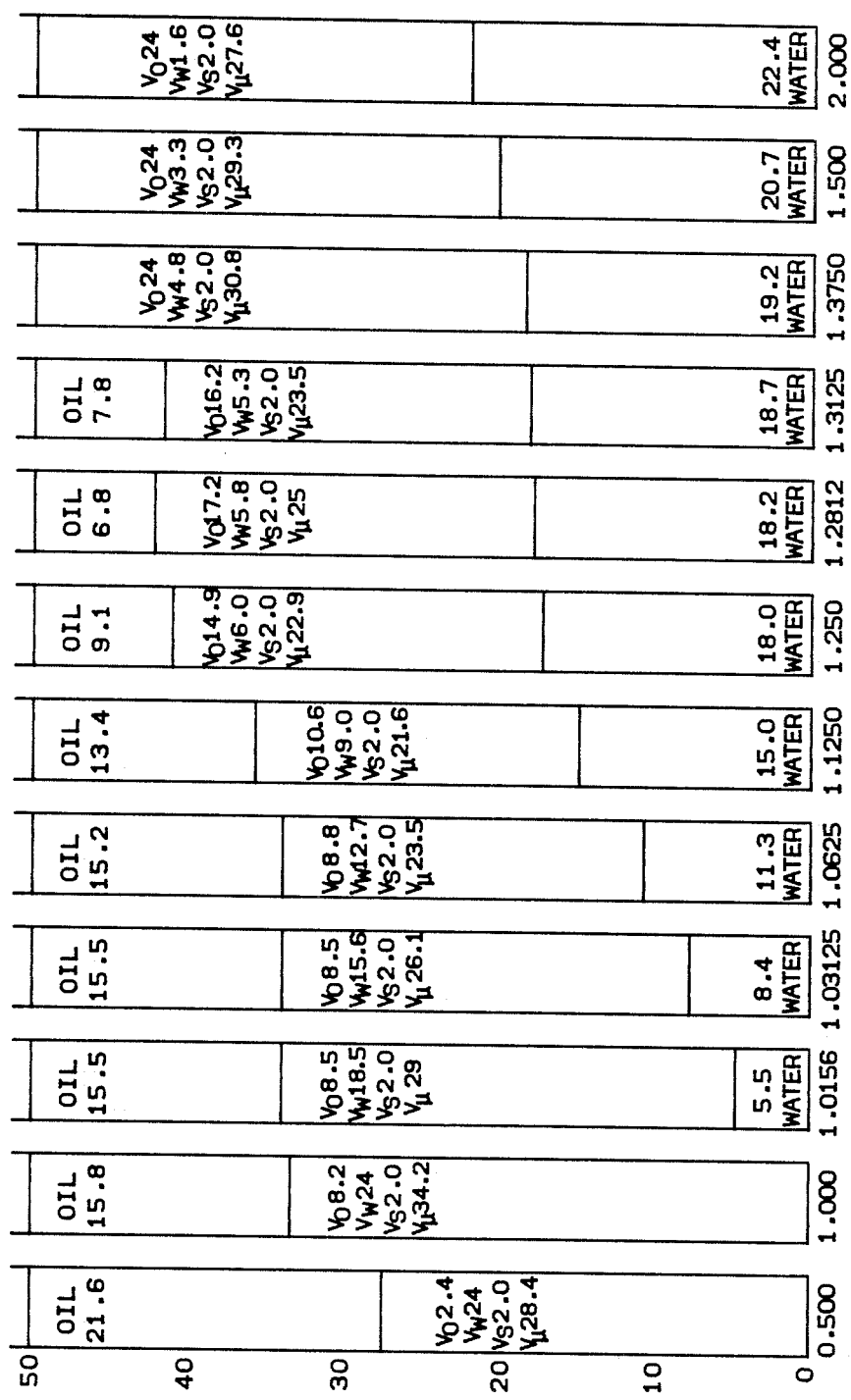
FIG. 5 is an analysis for the oil, water, surfactant, and cosurfactant contents of each of the phases of each sample used to prepare the graph of FIG. 4.

Further with regard to steps (a), (b) or (c), each surfactant-cosurfactant-electrolyte-water system is mixed with crude oil or a pure hydrocarbon preferably simulating oil from the reservoir to be flooded, for instance, by shaking in a ground glass-stoppered graduated cylinder and allowed to equilibrate. FIG. 5 shows the composition and the volumes of the different phases from a typical series of such equilibrations. Preferably, the surfactant system is mixed with an equal volume of oil so that the point at which equal volumes of oil and water are taken up into the middle microemulsion phase can easily be determined simply by measuring the volume of water remaining below and the volume of oil remaining above. As can be seen from FIG. 5, at very low salinities, a two-phase system is obtained, a lower water rich (so-called gamma type) microemulsion phase in equilibrium with a predominantly oil upper phase. At high salinities, a two-phase system, a lower predominantly water phase in equilibrium with an upper oil rich (so-called alpha type) microemulsion phase is obtained. At the intermediate salinities, both oil and aqueous phases exist in equilibrium with a middle (so-called beta type) microemulsion phase. In general, the minimum interfacial tension is associated with this middle microemulsion phase. In contrast to the behavior shown in FIG. 5, some systems will exhibit behavior wherein the middle phase rather than the upper phase will diminish in volume in the beta to alpha transition region. This in general does not interfere with the optimal salinity determination.

Of course in determining the unique salinity, the system of (a) must be arbitrarily chosen so as to have an optimal salinity which is relatively low and the system of (b) chosen so as to have an optimal salinity which is relatively high so as to bracket the unique salinity. This can easily be done by using a cosurfactant having a relatively low water solubility, i.e., isopentanol for the system of (a) and a cosurfactant having a relatively high water solubility such as 2-butanol for the system of (b). Generally, cosurfactants having a water solubility of 0.5 to 5 grams per 100 grams of water at room temperature can be utilized as the relatively water insoluble cosurfactant; and cosurfactants having a water solubility within the range of 10 grams per 100 grams of water at room temperature to infinity can be used for the relatively water soluble cosurfactant. At most, only a small number of experimental tests must be carried out to arrive at a series of surfactant systems having optimal salinities which bracket the unique salinity. Of course, there is no significance to the order in which this is carried out, i.e., the runs utilizing the intermediate solubility cosurfactants could be carried out first, or starting with low solubility cosurfactants and working to higher ones or vice versa can be used. Cosurfactants of intermediate solubility can be viewed as being in either the relatively water soluble or relatively water insoluble category.

Figure 4:
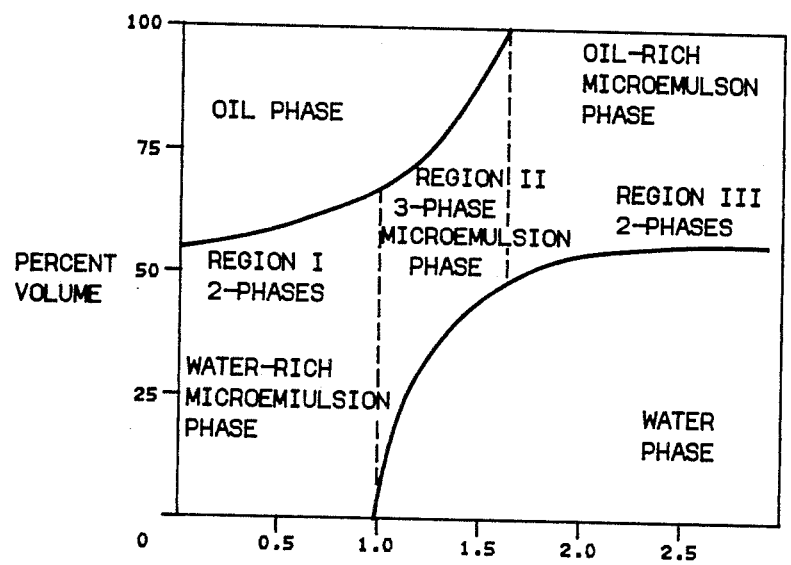
FIG. 4 is a phase volume diagram prepared by equilibrating oil and a surfactant-cosurfactant system with a series of sodium chloride brines of varying concentration.

It is known that crude oil performs relative to surfactant systems in a manner similar to relatively simple straight chain hydrocarbons and generally crude oil will act in a manner equivalent to straight chain alkanes having about 6 to 24, generally, 8 to 16 carbon atoms. The equivalent alkane carbon number (EACN) of crude oils is determined by the following steps:

(1) pure hydrocarbons are individually equilibrated with a given surfactant system comprising surfactant, cosurfactant, NaCl and water over a range of salinities to give data for a family of phase-volume diagrams similar to that shown in FIG. 4 from which the beta region width expressed in terms of parts per million salt concentration is graphically correlated with the carbon numbers of the respective pure hydrocarbons.

(2) selected crude oils are individually equilibrated with the same surfactant system of (1) over a range of salinities to give data for a family of phase-volume diagrams from which the beta region width in terms of ppm salt concentration is determined for each crude oil. For instance, in FIG. 4, the beta width is about 0.6, i.e., from 1.0 to 1.6 percent or in ppm about 6,000. That is, it is the width of the area between the two parallel lines defining the three phase region.

Figure 11:
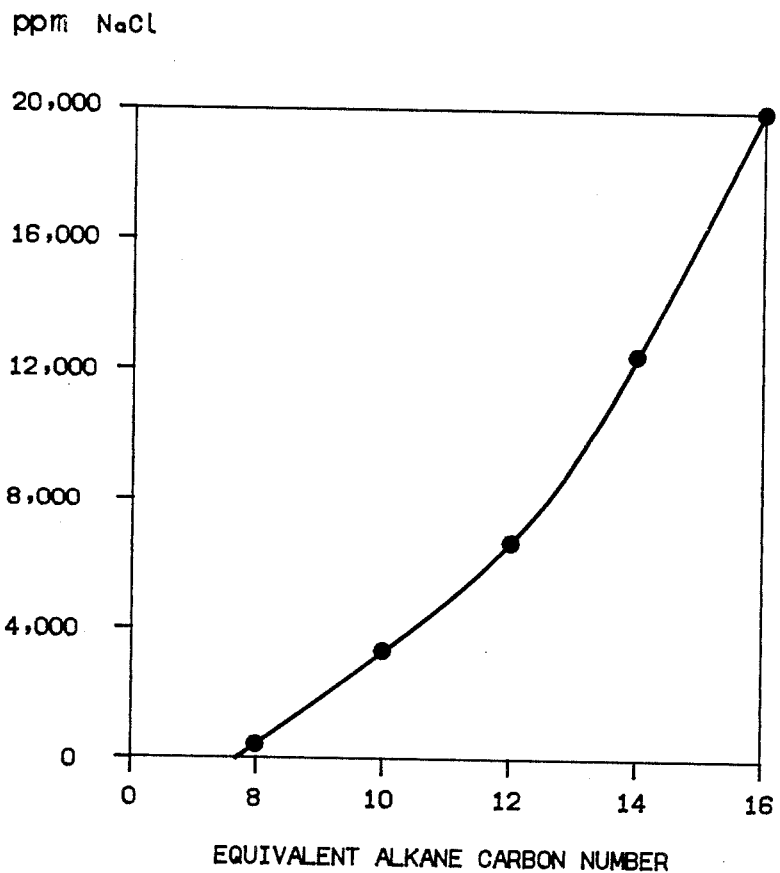
FIG. 11 is a plot of beta region width versus EACN.

(3) the "beta region width" determined in (2) are related to the graphical correlation of (1), i.e., in regard to hydrocarbon number and width of the beta region expressed in ppm salt concentrations to yield equivalent alkane carbon numbers for the crude oils. This is shown in FIG. 11. This is described in more detail in a paper by D. M. Sitton, SPE Paper No. 7870, presented in Houston, Texas on January 22-29, 1979, SPE of AIME International Symposium on Oilfield and Geothermal Chemistry held in Houston, Texas, the disclosure of which is hereby incorporated by reference.

Yet a more preferred method of determining the EACN is as follows. Relatively concentrated surfactant formulations are made up and optimal salinity as determined by phase behavior used to assign EACN's to crude oils. More specifically, the EACN of a crude oil is defined by comparing its optimal salinity with those for pure hydrocarbons, determined using a standard surfactant formulation.

Figure 12:
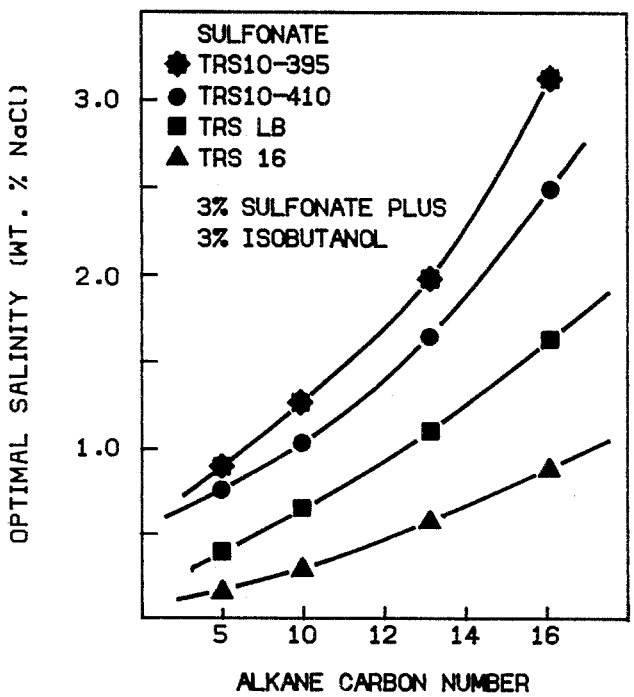
FIG. 12 is a plot of alkane carbon numbers versus optimal salinity for a series of surfactant systems using different surfactants.
Figure 13:
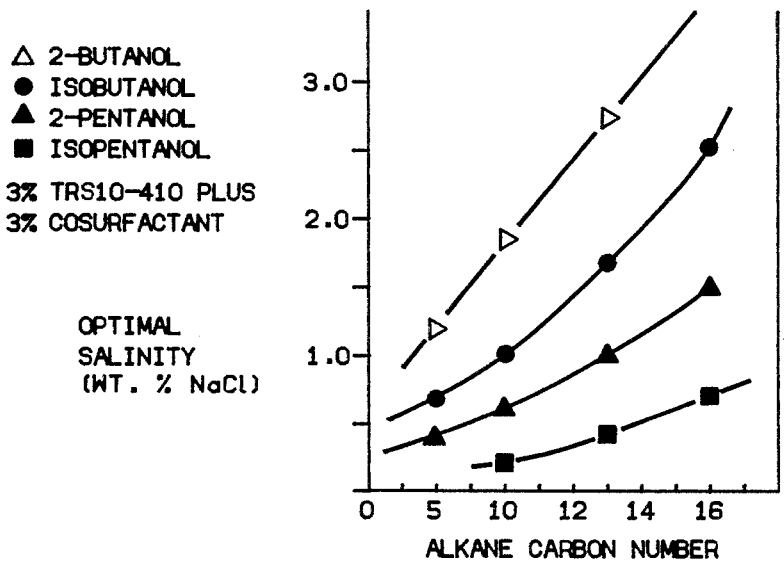
FIG. 13 is a similar plot using different cosurfactants.

FIGS. 12 and 13 show plots of optimal salinity versus alkane carbon number determined as discussed above for a series of surfactant formulations equilibrated with a series of pure alkane hydrocarbons. In all cases, the aqueous surfactant formulations contained 3 percent active sulfonate, 3 percent cosurfactant alcohol, 0.2 percent sodium tripolyphosphate and 0.1 percent sodium carbonate. FIG. 12 contains plots of optimal salinity versus alkane carbon number for systems containing various petroleum sulfonates and isobutanol as the cosurfactant. FIG. 13 contains similar plots for systems containing TRS 10-410 and various cosurfactant alcohols. The trends in optimal salinity observed in these studies with pure alkanes were consistent with those reported in the literature; namely, the optimal salinity increases with (1) increasing EACN of the oil, (2) increasing water solubility of the cosurfactant, and (3) decreasing equivalent weight of the sulfonate.

The technique is described in more detail in Society of Petroleum Engineering paper 8326 entitled "Surfactant Flooding With Emulsions Formed In-Situ-Effect of Oil Characteristics" by Gilbert R. Glinsmann, (1979), presented at the 54th Annual Fall Technical Conference, the disclosure of which is hereby incorporated by reference.

Briefly, the applicable surfactants (agents having substantial surface active characteristics) for the surfactant system can include cationic, anionic and nonionic surfactants, and are peferably petroleum sulfonates having an average equivalent weight within the range of 375 to 500, which surfactants are disclosed in more detail in said Glinsmann patent. The surfactant is generally present in an amount within the range of 0.1 to 10, preferably 1 to 7, more preferably 1.5 to 4.5 weight percent based on the weight of the surfactant system.

Cosurfactants (polar solubilizing agents with little or no surface active characteristics) suitable for use in the surfactant system of this invention are as disclosed in said Glinsmann patent. By solubilizing agents is meant agents to solubilize oil and water into the microemulsion. Briefly, these can be alcohols, esters, amines, aldehydes, ketones, phenols, and the like, such as methyl acetate, ethyl acetate, methyl propionate, ethyl propionate, N-N-diethylamine, isopentylamine, triethylamine, isobutyraldehyde, n-butanol, methyl ethyl ketone, 3-pentanone, p-cresol and phenol. Unsaturated alcohols can also be used in the instant process. Preferred cosurfactants are alcohols containing 1 to 6 carbon atoms, most preferably containing 3 to 5 carbon atoms. Alcohol cosurfactants which can be used either individually or in various blends in the instant process include methanol, ethanol, n-propanol, isopropanol, n-butanol, isobutanol, 2-butanol, tert-butyl alcohol, n-pentanol, 2-pentanol, 3-pentanol, tert-pentanol, isopentanol, n-hexanol, isohexanol, 2-hexanol, 3-hexanol and the like. Representative alcohol blends which can be used include, e.g., isopropanol/isopentanol, 2-butanol/2-pentanol, isobutanol/n-butanol, n-butanol/2-pentanol, 2-butanol/tert-pentanol, 2-pentanol/iso-pentanol and other such blends. Alcohols having a solubility of 0.5 to 20 grams per 100 grams of water at room temperature are particularly suitable. Cosurfactants are generally present in an amount within the range of 0.1 to 10 weight percent, perferably 1 to 7, more preferably 1.5 to 4.5 weight percent based on the weight of water in said surfactant system (or based on the water in the multiphase system formed after mixing the surfactant system and oil).

With respect to FIG. 4, there is shown a phase-volume diagram plotting the volume percent of the various phases achieved on equilibrating surfactant and oil as a function of the electrolyte content of the brine. Region 1 (upper oil phase; lower microemulsion phase) is frequently referred to as the two phase gamma region; Region 2 (upper oil phase; middle microemulsion phase; bottom water phase) is frequently referred to as the three phase beta region; and Region 3 (upper microemulsion phase; lower water phase) is frequently referred to as the two phase alpha region.

FIG. 5 shows in bar graph form the gamma, beta and alpha phases further broken down as to the exact composition of the microemulsion phase. As can be seen at about 1.125 weight percent brine in this example, the volume of oil and water in the microemulsion phase is about equal. This is the salinity known as the optimum salinity which is in general associated with good oil recovery although unless the optimal salinity and the unique salinity as defined hereinafter are identical, it is, in fact, possible to achieve better oil recovery in some instances at salinities other than at the optimal salinity.

Figure 6:
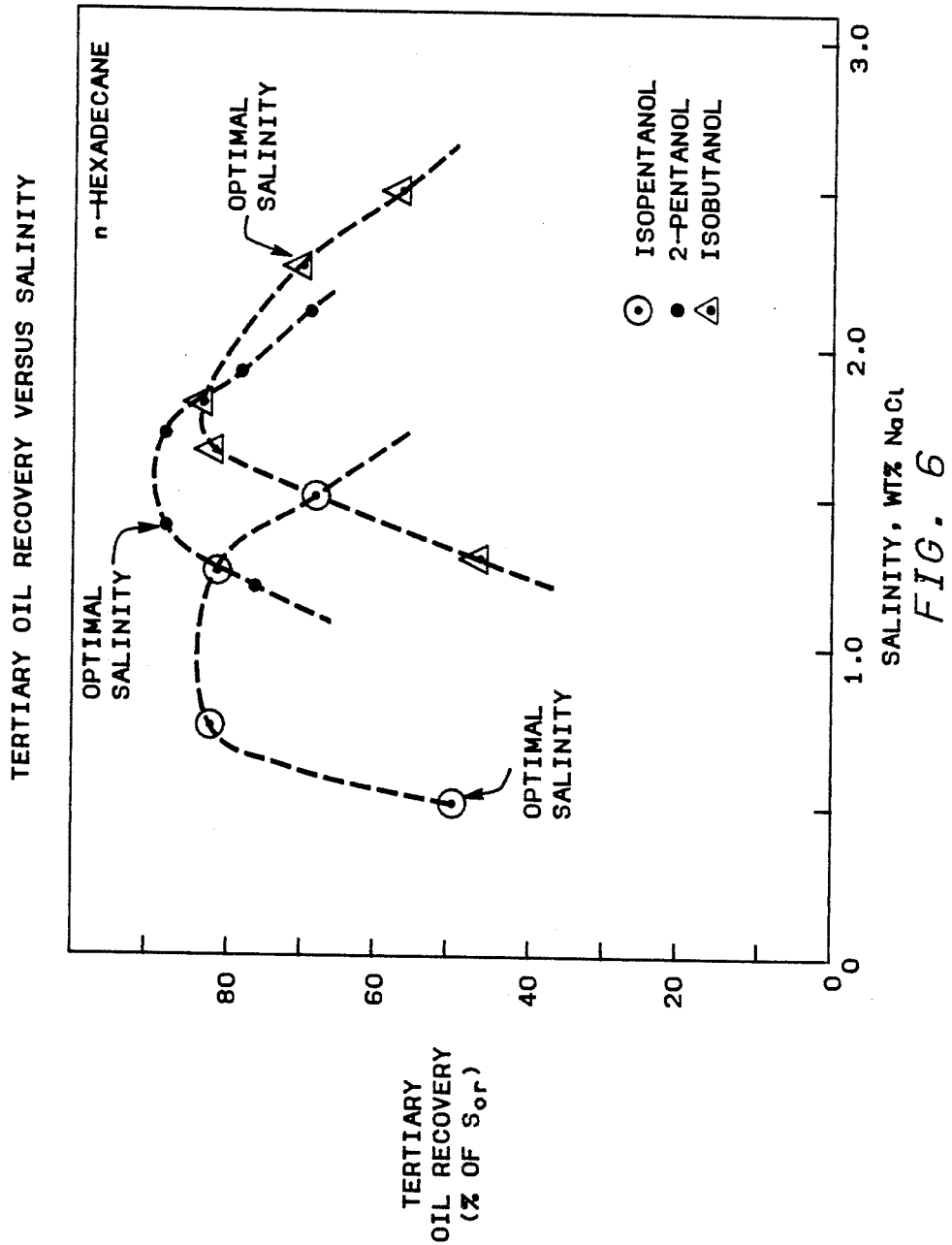
FIG. 6 is a plot of oil recovery versus salinity for surfactant systems using a single surfactant and varying cosurfactants, each surfactant-cosurfactant pair being used at varying salinities.

FIG. 6 is a plot of salinity versus tertiary oil recovery. The plot here represents actual oil recovery using a surfactant system comprising Witco TRS 10-410 petroleum sulfonate as the surfactant and in the first curve isopentanol as the cosurfactant. In the second curve, 2-pentanol is used and in the third curve, isobutanol is used. In each set of curves, an arrow designates the optimal salinity for that alcohol-surfactant combination. The second point in the isopentanol curve appears to be as a result of experimental error and the curve is drawn so as not to go through that point. These curves show that, while it is true that optimal salinity is in general associated with good oil recovery, it is generally possible to achieve better recovery at salinities which are not optimal and hence at which the amount of water and oil in the microemulsion phase is not equal.

In FIG. 7, tertiary oil recovery is plotted against salinity for a series of different surfactant systems utilizing the same surfactant but a different cosurfactant. Each of the points was obtained using the surfactant and cosurfactant at optimal salinity, i.e., at the salinity at which the water and oil composition of the microemulsion phase is about equal. As can be seen with the use of normal butanol or isobutanol, a peak is reached in the oil recovery at about 95 percent recovery or better. Indeed, the very highest recovery could be extrapolated from a point between the two and a mixture of the two alcohols could be used to achieve an actual oil recovery at the very top of the curve. The point at the top of the curve is what is defined as the unique salinity. At this salinity using either n-butanol or isobutanol which approximate the top of the curve, the volume of oil and water in the microemulsion phase is about equal since this is the definition of optimal salinity and all of the runs shown in this curve are at optimal salinity. Thus, with normal butanol and isobutanol, the optimal salinity is essentially equal to the unique salinity and it is at this condition where the optimal salinity and the unique salinity are identical that maximum oil recovery is obtained.

Figure 8:
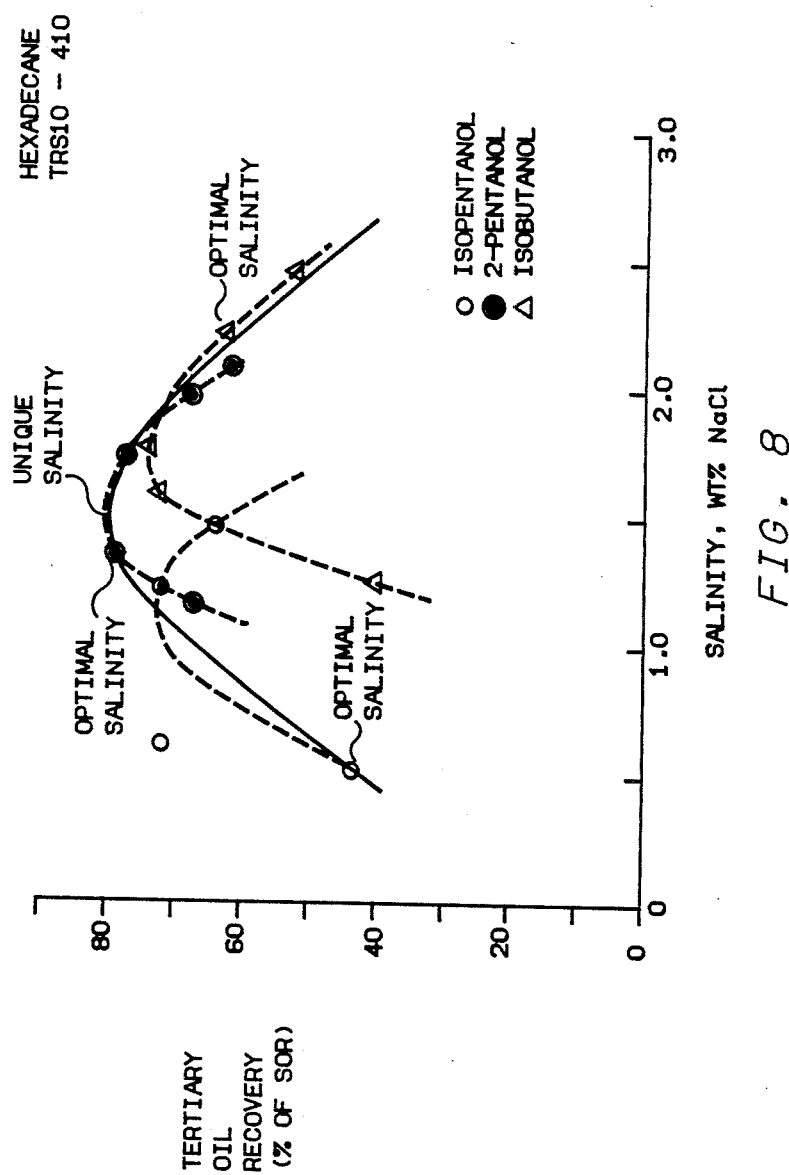
FIG. 8 is in essence FIG. 7 superimposed on FIG. 6.

FIG. 8 is simply FIG. 7 superimposed on FIG. 6. It is easy from this curve to visualize that the unique salinity-surfactant oil combination is at the point at which the optimal salinity coincides with maximum oil recovery and this Figure shows how totally impossible it would be to ever predict or accidentally produce the proper system simply by trial and error since one would be misled if he simply believed that the optimal salinity was the only consideration and even if one attempted to stray on each side from the optimal salinity to find a better system, it can be seen that unless by coincidence the proper alcohol is being used, the highest oil recovery would never be obtained.

Figure 9:
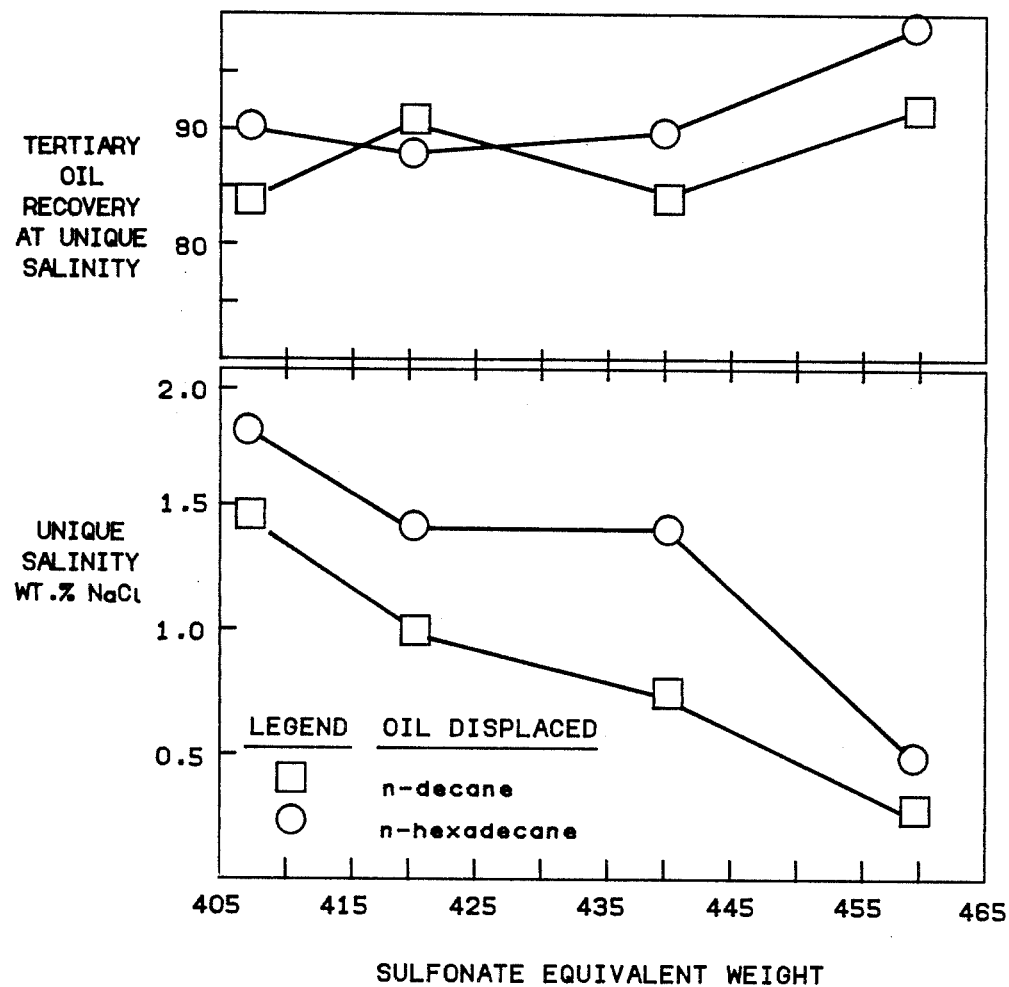
FIG. 9 is a plot of tertiary oil recovery versus the equivalent weight of the surfactant and also simultaneously a plot of the unique salinity versus the equivalent weight of the surfactant.

FIG. 9 is included to show that by utilizing the unique salinity (which can be done even in reservoirs having peculiar brine characteristics by virtue of the utilization of this invention) high oil recovery can be obtained over a wide range of salinities simply by utilizing the appropriate sulfonate required by the salinity encountered. This curve shows that formations having the higher salinities and requiring the use of the lower equivalent weight sulfonates, result in slightly lower oil recoveries which are apparently unavoidable.

Throughout this discussion reference has been made to varying the equivalent weight of the sulfonate. Actually, many surfactants can be used and the variation is really in the hydrophobic content of the surfactant. In the case of petroleum sulfonates, increasing the equivalent weight increases the hydrophobic character of the surfactant. With other surfactants, variations appropriate for that particular surfactant to increase the hydrophobic character have the same effect as increasing the equivalent weight of a petroleum sulfonate.

Similarly, the difference in the effect of the various cosurfactants as shown in FIG. 7, wherein all of the cosurfactants are alcohols is largely a function of the water solubility of the alcohol. At one time, it was thought that the alcohols of intermediate water solubility were preferred and this is generally true. For convenience, the factors affecting phase behavior going from gamma to beta to alpha while all other variables are kept constant are as follows:

(1) increasing the salt concentration;
(2) decreasing the water solubility of the cosurfactant (or increasing the concentration thereof);
(3) increasing the hydrophobic portion of the surfactant (i.e., increasing the equivalent weight in the case of a sulfonate);
(4) decreasing the effective alkane carbon number of the oil; or
(5) decreasing the equilibrium temperature.

Obviously in an actual formation, there is little that can be done to change the effective alkane carbon number of the oil and, as a practical matter, nothing can be done to change the temperature.

It is essential to bear in mind the distinction between using a cosurfactant of differing water solubility and/or a different concentration thereof to produce a system having an optimal salinity coinciding with the unique salinity on the one hand, and varying the surfactant hydrophobic content on the other hand in order to shift the optimal and unique salinities to a different value as described in FIG. 3.

It is noted from FIG. 3 that the standard plots depicted do not go significantly past 3 weight percent sodium chloride. While progressively lower equivalent weight sulfonates can be used to establish curves at higher salt concentrations, progressively poorer results are obtained and eventually the point is reached where the surfactant system simply precipitates out.

In utilizing the inventive concept of this application whereby the sodium chloride equivalency of an actual brine is determined, it is possible to very quickly prepare an optimized system for the reservoir if the sodium chloride equivalency is somewhere in the range of 0.1 percent to 3 weight percent or slightly higher. If the salt concentration is higher than that, there is the option of either preflushing to get the salt concentration down to a level where the standardized tables apply, or known high salinity tolerant surfactant systems can be utilized. Again, it is noted that without the use of the invention, one would not necessarily know that a high salinity brine system was needed since the system might in fact have an actual weight percent salt concentration which is relatively low.

SECOND ASPECT

Figure 10:
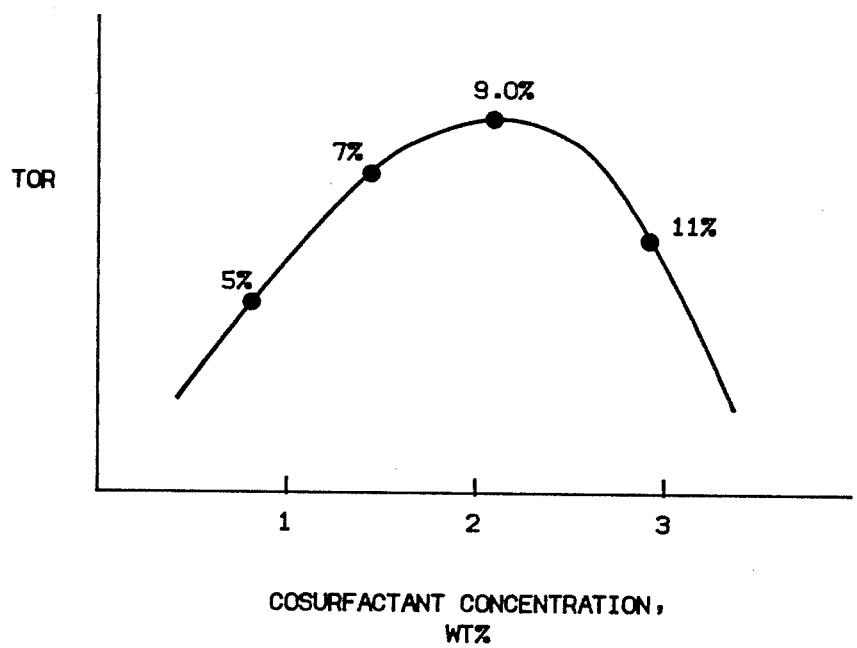
FIG. 10 is a plot of cosurfactant concentration versus oil recovery using a specific type of cosurfactant.

Alternatively, if the application of the NaCl equivalency aspect of this invention shows a high equivalent NaCl concentration, the following novel optimization scheme can be used. In this scheme, an ethoxylated sulfated alkyl substituted phenol is used as the cosurfactant. A series of such substituted phenols are used with varying ethoxylation contents, e.g., E.O. values from 2 to 20, preferably 5 to 12 to give one which gives an optimal salinity at relatively low concentration of the cosurfactant, such as 1 weight percent or less, generally about 0.5 to 1 weight percent based on the weight of water in the surfactant system. By the E.O. number is meant the number of oxyethylene units per mole of substrate. Then a series of surfactant systems are prepared varying only the concentration of the cosurfactant, and oil recovery is plotted against cosurfactant concentration. Here the cosurfactant concentration is varied from about 1–5, preferably 1–3 weight percent based on the weight of the water in the surfactant system. With this type of cosurfactant, a maximum in the oil recovery is obtained as shown by FIG. 10. The runs of FIG. 10 were all made at the actual salinity of the formation in question, for instance, 5 weight percent. The numbers superimposed on the curve itself represent the optimal salinity with the 1 percent cosurfactant point on the curve being 5 percent optimal salinity since it was a 5 percent reservoir brine that was the starting point and by definition the starting point was the determination of the degree of ethoxylation which gave optimal salinity corresponding to that of the reservoir at a relatively low concentration, arbitrarily set in this example at 1 percent. As can be seen, the maximum oil recovery occurs at 2.42 percent cosurfactant concentration. The optimal salinity for such a system would be 9 percent again showing that it is not possible to intuitively determine the correct surfactant system since in fact the salinity used was 5 percent (NaCl equivalent). Thus, while the salt concentration of the reservoir is beyond that in which the unique salinity concept applies and the recovery at optimal salinity is relatively low, utilizing this novel embodiment of the invention allows high oil recovery even in reservoirs having high sodium chloride equivalent salt concentrations. Suitable ethoxylated sulfated phenols are available from GAF Corporation under the tradenames Alipal. Examples thereof are Alipal CO-433 (4 E.O.); and Alipal EP-110 (9 E.O.).

This novel optimization method for selecting high salinity-tolerant surfactant systems for formations having high sodium chloride equivalencies minimizes the preliminary laboratory work required before undertaking field tests. The novel system using the ethoxylated sulfated alkyl substituted phenol set out hereinabove can be used.

The surfactant systems developed utilizing the techniques of both aspects of this invention can be used for oil recovery as known in the art, for instance as described in said Hessert et al patent. These surfactant systems can be prepared above ground including the incorporation above ground of the oil although more preferably the surfactant system is injected without the oil to form the microemulsion in situ. The injection of the surfactant slug may be preceded by a preflush and under certain embodiments of the invention, the preflush can be used to adjust the salinity as described in detail hereinbefore. Similarly, the surfactant slug can be followed by a mobility buffer and/or a drive fluid such as brine in a manner known in the art.

EXAMPLE I—(First Aspect)

This example describes the determination of the sodium chloride equivalency of two field brines obtained, respectively, from the Dougherty field and the Stewart Yates field. For the former field brine, a phase volume analysis of the system Witco TRS 10-410 petroleum sulfonate/isobutanol/n-decane in aqueous sodium chloride was carried out. For the latter field brine, a phase volume analysis of the system Witco TRS 10-410/isobutanol/ethoxylated 2-ethyl-1-hexanol in aqueous sodium chloride was considered.

In the first NaCl brine system, sodium chloride concentrations over the range of 0.5 to 1.5 weight percent were used and the TRS 10-410 petroleum sulfonate concentration and isobutanol concentration were held constant at 3 weight percent based on the weight of the surfactant system. Equilibration of 24 mL portions of n-decane with 26 mL aliquots of surfactant systems comprising successively 24 mL of brine containing 0.5, 0.8, 0.85, 1.0, 1.12, 1.2 and 1.5 weight % NaCl with 1 mL of surfactant and 1 mL of cosurfactant gave the following volumes in the three phase region, i.e., top essentially oil phase, middle microemulsion phase and bottom essentially water phase:

TABLE I

| System No. | Wt. % NaCl | Volumes of Phases (mL) | | |
|---|---|---|---|---|
| | | Top | Middle | Bottom |
| 1 | 0.5 | 22.5 | None | 27.5 |
| 2 | 0.8 | 19.5 | 28.5 | 2 |
| 3 | 0.85 | 18.5 | 21.5 | 10 |

TABLE I-continued

| System No. | Wt. % NaCl | Volumes of Phases (mL) | | |
|---|---|---|---|---|
| | | Top | Middle | Bottom |
| 4 | 1.0 | 16.5 | 16.5 | 17.0 |
| 5 | 1.12 | 5.5 | 26.0 | 18.5 |
| 6 | 1.2 | 31 | None | 19 |
| 7 | 1.5 | 29 | None | 21 |

These values are plotted in a typical phase-volume diagram as shown by FIG. 1. Substitution of the Dougherty field brine for aqueous sodium chloride gave the following phase volumes: Bottom phase 14 mL, Middle phase 18.6 mL and Top phase 17.4 mL. It is evident from the above table of phase volumes or from FIG. 1 that the Dougherty field brine simulates or is equivalent to the phase behavior expected from 0.92 weight percent NaCl brine.

In the second NaCl brine system, sodium chloride concentrations over the range of 3 to 10 weight percent were used and the TRS 10-410 petroleum sulfonate, isobutanol and ethoxylated 2-ethyl-1-hexanol (E.O.=10) concentrations were individually held at 3 weight percent based on the weight of the surfactant system. Equilibration of 24 mL portions of n-decane with 26 mL aliquots of surfactant systems comprising successively 23 mL of brine containing 3, 4, 5, 7, 8.5 and 10 weight percent NaCl with 1 mL of surfactant and 1 mL of each of the above cosurfactants such that the surfactant system contained 3 weight percent (active basis) of surfactant and each cosurfactant gave the following phase volumes:

TABLE II

| System No. | Wt. % NaCl | Volumes of Phases (mL) | | |
|---|---|---|---|---|
| | | Top | Middle | Bottom |
| 8 | 3 | 23.2 | None | 26.8 |
| 9 | 4 | 22.8 | None | 27.2 |
| 10 | 5 | 22 | 13 | 15 |
| 11 | 7 | 21 | 10 | 19 |
| 12 | 8.5 | 18.5 | 11.5 | 20 |
| 13 | 10 | 29.5 | None | 20.5 |

These volumes are plotted in a typical phase-volume diagram as shown by FIG. 2. Substitution of the Stewart Yates field brine for aqueous sodium chloride gave the following phase volume: Bottom phase 15.7 mL, Middle phase 11.9 mL, and Top phase 22.4 mL. It is evident from the above table of phase volumes or from FIG. 2 that the Stewart Yates field brine simulates or is equivalent to the phase behavior expected from approximately 5 weight percent NaCl brine.

EXAMPLE II—(SECOND ASPECT)

A suite of 23 core runs (see Table III) were carried out to substantiate the unique cosurfactant concept as disclosed in the instant teaching. Suitable cosurfactants include the anionic polyethoxylated alkyl phenols such as the sulfated, sulfonated or carboxyalkylated derivatives of polyethoxylated alkyl phenols especially such materials derived from nonylphenol. Preferred cosurfactants include sulfated polyethoxylated nonylphenols with average E.O. (ethylene oxide) numbers of 4 (Alipal ®CO-433), 9 (Alipal ®110) and 15 (Alipal ®115).

All of the oil displacement tests summarized in Table III were conducted in 3'×3" waterwet Berea sandstone cores at 78° F. In each displacement test, the cores were brought to a state of waterflood residual oil using conventional procedures. The cores were (1) saturated with brine at the salinity of interest, (2) flooded with a designated crude oil to an irreducible water saturation, and (3) flooded with water to an irreducible oil saturation (waterflood residual) prior to surfactant flooding. The surfactant flood was conducted at a frontal velocity of 0.6 foot per day with the cores in a horizontal position. The cores were rotated continuously 2.4 revolutions per hour to reduce gravity segregation effects.

The surfactant slug contained Witco ®10-410 petroleum sulfonates (3.0 weight percent active basis) and selected cosurfactant (3.0 weight percent active basis) comprising anionic polyethoxylated alkylphenols. The surfactant slug was followed by 0.5 PV of mobility buffer containing 2500-5000 ppm Betz Hi Vis polyacrylamide graded back logarithmically with connate water brine. The core run results are summarized in Table III.

TABLE III

UNIQUE COSURFACTANT CONCENTRATIONS AND OPTIMAL % TOR

| Run No. | Cosurfactant$^a$ Conc. (Wt. %) | % TOR |
|---|---|---|
| 1 | 1.20 | 8.1 |
| 2 | 1.55 | 55.1 |
| 3 | 1.65$^b$ | 62.9* |
| 4 | 1.65$^b$ | 63.2* |
| 5 | 1.75 | 57.5 |
| 6$^c$ | 2.0 | 49.1 |
| 7 | 2.5 | 23.7 |
| 8 | 3.5 | 38.7 |
| 9 | 4.0$^b$ | 53.4* |
| 10 | 4.2 | 38.1 |
| 11 | 4.5 | 45.2 |
| 12$^d$ | 5.0 | 31.6 |
| 13 | 0.5 | 22.6 |
| 14 | 1.0 | 55.6 |
| 15 | 1.25$^b$ | 67.7* |
| 16$^e$ | 1.5 | 53.8 |
| 17 | 2.0 | 49.0 |
| 18 | 2.5$^b$ | 60.1* |
| 19$^f$ | 3.0 | 47.3 |
| 20 | 0.8 | 35.6 |
| 21 | 1.3 | 51.8 |
| 22 | 1.55$^b$ | 64.2* |
| 23$^g$ | 1.8 | 49.2 |

$^a$Cosurfactant was a sulfated polyethoxylated nonylphenol (E.O. = 4 or 9).
$^b$Unique cosurfactant concentration.
*Maximum % TOR (% Tertiary Oil Recovery).
$^c$Runs 1-6 used crude oil and field brine from reservoir "A". Petroleum sulfonates of intermediate molecular weights were used.
$^d$Runs 7-12 used crude oil and field brine from reservoir "B". Petroleum sulfonates of intermediate molecular weights were used.
$^e$Runs 13-16 used crude oil and field brine from reservoir "C". Mixed petroleum sulfonates were used.
$^f$Runs 17-19 used crude oil and field brine from reservoir "A". Petroleum sulfonates of high molecular weights were used.
$^g$Runs 20-23 used crude oil and field brine from reservoir "A". Petroleum sulfonates of low molecular weights were used.

Referring to the results in Table III, it is evident that the % TOR passes through a maximum corresponding to the unique cosurfactant concentration (see, e.g., runs 3 and 4; run 9; run 15; run 18 and run 22).

While this invention has been described in detail for the purpose of illustration, it is not to be construed as limited thereby but is intended to cover all changes and modifications within the spirit and scope thereof.

I claim:

1. A method for determining a sodium chloride equivalency of a reservoir brine comprising
   (1) combining said brine with a hydrocarbon-surfactant-cosurfactant system to give a multiphase system and determining the relative volumes of the resulting phases;
   (2) comparing said relative volumes with known phase volume diagrams of the same hydrocarbon-surfactant-cosurfactant system at various sodium chloride concentrations and determining the salinity of the known system at which the relative volumes are the same as in (1).

2. A method according to claim 1 wherein said surfactant is a petroleum sulfonate and said cosurfactant is an alcohol.

3. A method of tailoring a surfactant system to a particular reservoir comprising
   (a) determining the sodium chloride equivalency of brine in said reservoir by
      (1) combining said brine with a hydrocarbon-surfactant-cosurfactant system to give a multiphase system and determining the relative volumes of the resulting phases;
      (2) comparing said relative volumes with known phase volume diagrams of the same hydrocarbon-surfactant-cosurfactant system at various sodium chloride salinities and determining the salinity of the known system at which the relative volumes are the same as in (1);
   (b) determining the EACN of oil from said reservoir;
   (c) selecting a surfactant system from diagrams of known systems made using an oil of the same or essentially the same EACN as determined in (b) and a salinity essentially corresponding with that determined in (a).

4. A method according to claim 3 wherein said surfactant system comprises a petroleum sulfonate surfactant and an alcohol cosurfactant.

5. A method according to claim 4 wherein said petroleum sulfonate surfactant has an equivalent weight within the range of 375 to 500 and said EACN is within the range of 6 to 24.

6. A method according to claim 5 wherein said alcohol is a $C_3$ to $C_5$ to alcohol inclusive.

7. A method according to claim 3 wherein said sodium chloride equivalency is within the range of 0.1 to 3 weight percent.

8. A method according to claim 7 wherein said cosurfactant is present in said hydrocarbon-surfactant-cosurfactant system of (1) in an amount within the range of 1 to 7 weight percent based on the weight of water in said multiphase system and said surfactant is a petroleum sulfonate having an average equivalent weight within the range of 375 to 500.

9. A method of tailoring a surfactant system for a particular reservoir comprising
   (a) determining the sodium chloride equivalency of said reservoir by
      (1) combining brine from said reservoir with a hydrocarbon-surfactant-cosurfactant system to given a multiphase system and determining the relative volumes of the resulting phases;
      (2) comparing said relative volumes with known phase volume diagrams of the same hydrocarbon-surfactant-cosurfactant system at various sodium chloride salinities and determining the salinity of the known system at which the relative volumes are the same as in (1);
   (b) determining the EACN of oil from said reservoir;
   (c) forming a series of surfactant systems with a surfactant, an ethoxylated sulfated alkyl substituted phenol cosurfactant and oil from the reservoir or oil equivalent to the oil from the reservoir and determining the ethoxylation degree necessary to give an optimum salinity at a low concentration of the cosurfactant, said optimum salinity being defined as that salinity in which an equilibrated multiphase system made up of said oil from said reservoir or said oil equivalent to the oil from the reservoir and said surfactant and said cosurfactant, which system comprises a microemulsion phase, has in said microemulsion phase approximately equal volumes of oil and water;

(d) forming a series of surfactant systems using the same ingredients as in (c) at progressively increasing cosurfactant concentrations;

(e) displacing oil from test cores with said systems of (d) and plotting the oil recovery versus cosurfactant concentration to establish a maximum oil recovery at some higher level of cosurfactant concentration, this being the surfactant composition to be selected for said reservoir.

10. A method according to claim 9 wherein said ethoxylated sulfated phenol has an ethoxylation content within the range of 5 to 12 ethoxy units per molecule.

11. A method according to claim 10 wherein said surfactant is a petroleum sulfonate.

12. A method according to claim 10 wherein said surfactant is a petroleum sulfonate.

13. A method according to claim 9 wherein said cosurfactant concentration of (d) is varied from 1 to 3 weight percent based on the weight of water in said surfactant systems.

14. A method according to claim 9 wherein said low concentration of (c) is 1 weight percent or less based on the weight of water in said surfactant systems.

15. A method of recovering oil from a subterranean reservoir comprising the steps of:

(a) determining the sodium chloride equivalency of said reservoir by
  (1) combining brine from said reservoir with a hydrocarbon-surfactant-cosurfactant system to give a multiphase system and determining the relative volumes of the resulting phases;
  (2) comparing said relative volumes with known phase volume diagrams of the same hydrocarbon-surfactant-cosurfactant system at various sodium chloride salinities and determining the salinity of the known system at which the relative volumes are the same as in (1);

(b) determining the EACN of said reservoir oil;

(c) selecting a surfactant system from known systems made using an oil of the same or essentially the same EACN as determined in (b) and a salinity essentially corresponding with that determined in (a);

(d) injecting said surfactant system of (c) into said reservoir;

(e) thereafter injecting a drive fluid, thus forcing said oil from said reservoir toward at least one recovery well; and (f) recovery of said oil.

16. A method according to claim 15 wherein said sodium chloride equivalency of said reservoir is within the range of 0.1 to 3 weight percent.

17. A method according to claim 15 wherein said surfactant system of (c) is a high salinity surfactant system.

18. A method according to claim 17 wherein said surfactant system of (c) is prepared by (aa) determining the sodium chloride equivalency of said reservoir by
  (1) combining said brine with a hydrocarbon-surfactant-cosurfactant system to give a multiphase system and determining the relative volumes of the resulting phases;
  (2) comparing said relative volumes with known phase volume diagrams of the same hydrocarbon-surfactant-cosurfactant system at various sodium chloride salinities and determining the salinity of the known system at which the relative volumes are the same as in (1);

(bb) determining the EACN of said reservoir oil;

(cc) forming a series of surfactant systems with a surfactant, an ethoxylated sulfated substituted phenol cosurfactant and oil from said reservoir or oil equivalent to said oil from said reservoir and determining the ethoxylation degree necessary to give an optimum salinity at a low concentration of the cosurfactant, said optimum salinity being defined as that salinity in which an equilibrated multiphase system made up of said oil from said reservoir or said oil equivalent to the oil from the reservoir and said surfactant and said cosurfactant, which system comprises a microemulsion phase, has in said microemulsion phase approximately equal volumes of oil and water;

(dd) forming a series of surfactant systems using the same ingredients as in (cc), and at the same ethoxylation degree as determined in (cc), at progressively increasing cosurfactant concentrations;

(ee) displacing oil from test cores with said systems of (dd) and plotting the oil recovery versus cosurfactant concentration to determine the cosurfactant concentration at which maximum oil recovery is obtained, this being the surfactant composition to be selected for said reservoir.

19. A method according to claim 18 wherein said sodium chloride equivalency is greater than 3 weight percent.

20. A method of tailoring a surfactant system for a particular reservoir comprising (a) forming a series of surfactant systems with a surfactant, an ethoxylated sulfated substituted phenol cosurfactant and oil from said reservoir or oil equivalent to said oil from said reservoir and determining the ethoxylation degree necessary to give an optimum salinity at a low concentration of the cosurfactant, said optimum salinity being defined as that salinity in which an equilibrated multiphase system made up of said oil from said reservoir or said oil equivalent to the oil from the reservoir and said surfactant and said cosurfactant, which system comprises a microemulsion phase, has in said microemulsion phase approximately equal volumes of oil and water;

(b) forming a series of surfactant systems using the same ingredients as in (a) at progressively increasing cosurfactant concentrations;

(c) displacing oil from test cores with said systems of (b) and plotting the oil recovery versus cosurfactant concentration to determine the cosurfactant concentration at which maximum oil recovery is obtained, this being the surfactant composition to be selected for said reservoir.

21. A method according to claim 20 wherein said ethoxylated sulfated phenol has an ethoxylation content within the range of 5 to 12 ethoxy units per molecule.

22. A method according to claim 20 wherein said cosurfactant concentration of (b) is varied from 1 to 3 weight percent based on the weight of water in said systems.

23. A method according to claim 20 wherein said low concentration of (a) is 1 weight percent or less based on the weight of water in said systems.

24. A method of recovering oil from a subterranean reservoir comprising the steps of:
 (a) injecting into said reservoir a surfactant system prepared by:
  (aa) forming a series of surfactant systems with a surfactant, an ethoxylated sulfated substituted phenol cosurfactant and oil from the reservoir or oil equivalent to the oil from the reservoir and determining the ethoxylation degree necessary to give an optimum salinity at a low concentration of the cosurfactant, said optimum salinity being defined as that salinity in which an equilibrated multiphase system made up of said oil from said reservoir or said oil equivalent to the oil from the reservoir and said surfactant and said cosurfactant, which system comprises a microemulsion phase, has in said microemulsion phase approximately equal volumes of oil and water;
  (bb) forming a series of surfactant systems using the same ingredients as in (aa), and at the ethoxylation degree as determined in (aa), at progressively increasing cosurfactant concentrations;
  (cc) displacing oil from test cores with said systems of (bb) and plotting the oil recovery versus cosurfactant concentration to establish a maximum oil recovery at some higher level of cosurfactant concentration, this being the surfactant composition to be selected for said reservoir;
 (b) thereafter injecting a drive fluid, thus forcing said oil from said reservoir toward at least one recovery well; and
 (c) recovering said oil from said reservoir.

* * * * *

UNITED STATES PATENT AND TRADEMARK OFFICE
CERTIFICATE OF CORRECTION

PATENT NO. : 4,473,116

DATED : September 25, 1984

INVENTOR(S) : James H. Hedges

It is certified that error appears in the above-identified patent and that said Letters Patent is hereby corrected as shown below:

In Abstract, second column, line 24, after "equal)" delete "which" at the end of the line, and before "is" insert --- where the cosurfactant concentration ---;
line 26, after "higher", delete "surfactant" and insert --- cosurfactant ---.

Claim 12, column 15, line 23 (first line of claim 12), delete "10", and insert --- 20 ---.

Signed and Sealed this

Sixteenth Day of August, 1988

Attest:

DONALD J. QUIGG

*Attesting Officer*   *Commissioner of Patents and Trademarks*